United States Patent [19]

Fujiguchi et al.

[11] Patent Number: 5,602,201

[45] Date of Patent: Feb. 11, 1997

[54] IMPACT RESISTANT RESIN COMPOSITION

[75] Inventors: Tomohide Fujiguchi; Akihiro Saito; Hideyuki Itoi, all of Utsunomiya, Japan

[73] Assignee: General Electric Company, Pittsfield, Mass.

[21] Appl. No.: 372,258

[22] Filed: Jan. 13, 1995

[30] Foreign Application Priority Data

Jan. 12, 1994 [JP] Japan .................... 6-013103

[51] Int. Cl.$^6$ .................... C08G 63/48; C08G 64/00
[52] U.S. Cl. .................... 525/67; 525/451; 525/464; 525/467; 525/468; 525/479; 528/196; 528/198; 528/199; 528/204
[58] Field of Search .................... 525/67, 464 A, 525/464 D, 467, 468 A, 468 B, 468 C, 451 D, 479; 528/196, 198, 199, 204

[56] References Cited

U.S. PATENT DOCUMENTS

| | | | |
|---|---|---|---|
| 3,028,365 | 4/1962 | Schnell | 528/196 |
| 3,334,154 | 8/1967 | Kim | 528/196 |
| 3,663,471 | 5/1972 | Schirmer et al. | 524/434 |
| 3,988,389 | 10/1976 | Margotte et al. | 525/67 |
| 4,503,183 | 3/1985 | Liu | 524/504 |
| 4,735,978 | 4/1988 | Ishihara | 524/162 |
| 4,812,515 | 3/1989 | Kress et al. | 525/69 |
| 4,888,388 | 12/1989 | Hongo et al. | 525/67 |
| 5,026,817 | 6/1991 | Sakashita et al. | 528/199 |
| 5,097,002 | 3/1992 | Sakashita et al. | 528/199 |
| 5,142,018 | 8/1992 | Sakashita et al. | 528/199 |

FOREIGN PATENT DOCUMENTS

| | | |
|---|---|---|
| 0260558 | 3/1988 | European Pat. Off. . |
| 0307963 | 1/1990 | European Pat. Off. . |
| 0508774 | 10/1992 | European Pat. Off. . |
| 0508774A3 | 1/1993 | European Pat. Off. . |
| 0565311 | 10/1993 | European Pat. Off. . |
| 6-136252 | 5/1994 | Japan . |
| WO-A-9322382 | 4/1993 | WIPO . |

*Primary Examiner*—Terressa Mosley

[57] ABSTRACT

Resin composition comprising (A) 1–99 parts by weight of a copolymeric polycarbonate, in which there are structural units represented by the following formulas (Structure 1) and (Structure 2) and the amount of the structural unit of the (Structure 2) is in the range of 2–90 mol % of the total amount of the structural units of the (Structure 1) and (Structure 2), or its mixture with a polycarbonate resin; (B) 1–99 parts by weight of SAN resin; and at the same time, of the total amount of (A) and (B) as 100 parts by weight, (C) 0.5–40 parts by weight of ABS resin and (D) 0.5–40 parts by weight of a rubber complex graft copolymer comprising rubber complex containing polyorganosiloxane and polyalkyl (meth)acrylate with a graft-polymerized vinyl monomer.

8 Claims, No Drawings

IMPACT RESISTANT RESIN COMPOSITION

SUMMARY OF INVENTION

Resin composition comprising (A) 1–99 parts by weight of a copolymeric polycarbonate, in which there are structural units lo represented by the following formulas (Structure 1) and (Structure 2) and the amount of the structural units of (Structure 2) is in the range of 2–90 mol % of the total amount of the structural units of (Structure 1) and (Structure 2), or its mixture with a polycarbonate resin; (B) 1–99 parts by weight of SAN resin; and at the same time, of the total amount of (A) and (B) as 100 parts by weight, (C) 0.5–40 parts by weight of ABS resin and (D) 0.5–40 parts by weight of a rubber complex graft copolymer comprising rubber complex containing polyorganosiloxane and polyalkyl (meth)acrylate with a graft-polymerized vinyl monomer.

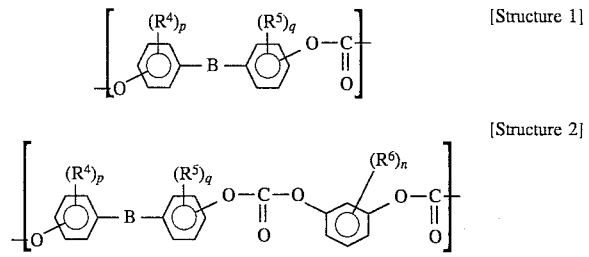

In the formulas, $R^4$ and $R^5$ are independently halogen atoms or univalent hydrocarbon groups, B is $-(R^1-)C(-R^2)-$ (where $R^1$ and $R^2$ are independently hydrogen atoms or univalent hydrocarbon groups), $-C(=R^3)-$ where $R^3$ is a divalent hydrocarbon group, $-O-$, $-S-$, $-SO-$ or $-SO_2-$; $R^6$ is a hydrocarbon group having 1–10 carbon atoms, its halogenated derivative or halogen atom, and p, q and n are independently integers of 0–4.

DETAILED EXPLANATION OF THE INVENTION

Industrial application field

This invention pertains to a polycarbonate resin composition having excellent low-temperature impact resistance.

Prior art and problems to be solved by the invention

Because of excellent heat resistance, impact resistance, etc., polycarbonate resins have been used in various application fields, but there are also shortcomings such as high molding and processing temperature, poor fluidity, significant dependency of impact strength on thickness, etc.

Therefore, various attempts have been made to solve these problems by blending polycarbonate resins with ABS (acrylonitrile-butadiene-styrene) resins (Japanese Kokoku Patent Nos. Sho 38[1963]-15225, Sho 48[1973]-12170, Sho 57[1982]-21530 and Sho 58[1983]-46269, etc.)

Furthermore, it is also known that the impact resistance can be improved if a rubber complex graft copolymer comprising rubber complex containing polyorganosiloxane rubber and polyalkyl (meth)acryate rubber components and graft-polymerized vinyl monomers is blended (Japanese Kokai Patent Application No. Sho 64[1989]-79257).

However, the low temperature impact resistance was not satisfactory in any of those resin compositions.

Objective of invention

Therefore, one objective of this invention is to provide a polycarbonate resin composition having improved low-temperature impact resistance.

Means to accomplish the objective

The authors of the current invention found that by adding two specific kinds of rubber combined in a polycarbonate resin having a specific structure, the impact resistance, especially low-temperature impact resistance, could be improved drastically to an extent not predictable by adding them alone individually.

Specifically, this invention provides an impact-resistant resin composition comprising (A) 1–99 parts by weight of a copolymeric polycarbonate, in which there are structural units represented by the following formula Structure 3:

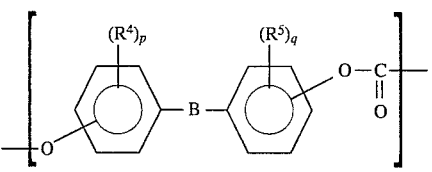

and the following formula Structure 4:

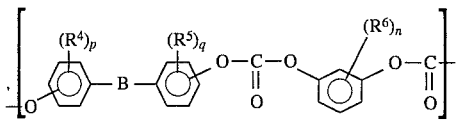

In the above, $R^4$ and $R^5$ are independently halogen atoms or univalent hydrocarbon groups; B is $-(R^1-)C(-R^2)-$ (where $R^1$ and $R^2$ are independently hydrogen atoms or univalent hydrocarbon groups); $-C(=R^3)-$ (where $R^3$ is a divalent hydrocarbon group); $-O-$, $-S-$, $-SO-$ or $-SO_2-$. $R^6$ is a hydrocarbon group having 1–10 carbon atoms, its halogenated derivative or halogen atom. Finally p, q and n are independently integers of 0–4. The amount of the structural units of Structure 4 is in the range of 2–90 mol % of the total amount of the structural units of Structure 3 and Structure 4 or its mixture with a polycarbonate resin. The invention further comprises (B) 1–99 parts by weight of a copolymer containing (a) aromatic vinyl monomer and (b) vinyl cyanide monomer as a component. At the same time, on the total amount of (A) and (B) of 100 parts by weight. The invention also contains (C) 0.5–40 parts by weight of a copolymer containing (a) aromatic vinyl monomer, (b) vinyl cyanide monomer and (c) elastomer as a component. The invention also comprises (D) 0.5–40 parts by weight of a rubber complex graft copolymer comprising rubber complex containing polyorganosiloxane and polyalkyl (meth)acrylate with a graft-polymerized vinyl monomer.

This invention is characterized by combining the above components (C) and (D) and adding them to a copolymeric polycarbonate resin having the above specific structure. By combining the two components, the low-temperature impact resistance of the resin composition becomes high to an extent not predictable from [the results] obtained by adding these components alone individually.

The component (A) of this invention is the above copolymeric polycarbonate or its mixture with a polycarbonate resin.

The copolymeric polycarbonate of this invention is required to have the constituting units represented by the above formulas, (Structure 3) and (Structure 4). First of all, the constituting unit represented Structure 3 comprises diphenol and carbonate components. Specific examples of diphenol that can be used to introduce the diphenol component are represented Structure 5.

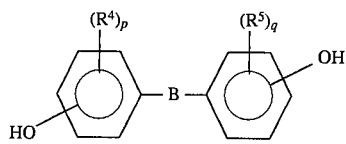

In the above formula, $R^4$, $R^5$, B, p and q are the same as those shown above.

As a diphenol effectively usable in this invention, there are, for example, bis(hydroxyaryl)alkanes such as bis(4-hydroxyphenyl)methane, 1,1-bis(4-hydroxyphenyl)ethane, 2,2-bis(4-hydroxyphenyl)propane (that is, bisphenol A), 2,2-bis(4-hydroxyphenyl)butane, 2,2-bis(4-hydroxyphenyl)octane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, etc.; bis(hydroxyaryl)cycloalkanes such as 1,1-bis(4-hydroxyphenyl)cyclopentane, 1,1-bis(4-hydroxyphenyl)cyclohexane, etc.; dihydroxyaryl ethers such as 4,4'-dihydroxydiphenyl ether, 4,4'-dihydroxy-3,3'-dimethylphenyl ether, etc.; dihydroxydiaryl sulfides such as 4,4'-dihydroxydiphenyl sulfide, 4,4'-dihydroxy-3,3'-dimethyldiphenyl sulfide, etc.; dihydroxydiaryl sulfoxides such as 4,4'-dihydroxydiphenyl sulfoxide, 4,4'-dihydroxy-3,3'-dimethyldiphenyl sulfoxide, etc.; and dihydroxydiaryl sulfones such as 4,4'-dihydroxydiphenyl sulfone, 4,4'-dihydroxy-3,3'-dimethyldiphenyl sulfone, etc., but it is not necessarily limited to them. These compounds may be used alone or in combination of 2 or more kinds. Among them, the use of 2,2-bis(4-hydroxyphenyl)propane is preferable.

Furthermore, as a precursor to introduce the carbonate component, there are, for example, diesters of carbonic acid such as diphenyl carbonate, ditolyl carbonate, bis(chlorophenyl)carbonate, m-cresyl carbonate, dinaphthyl carbonate, bis(diphenyl)carbonate, diethyl carbonate, dimethyl carbonate, dibutyl carbonate, dicyclohexyl carbonate, etc., and halogenated carbonyl compounds such as phosgene, etc. These compounds may be used alone or in combination or 2 or more kinds. The use of diphenyl carbonate is especially preferable.

Secondly, the structural unit represented by the above Structure 4 comprises diphenol, resorcinol and/or substituted resorcinol and carbonate components. To introduce the diphenol component, the same diphenol compounds as those described above are usable. Furthermore, as a carbonate component, the above diesters of carbonic acid and phosgene are usable. To introduce the resorcinol and/or substituted resorcinol component, one, two or more kinds of compounds represented by the following formula Structure 6 may be used.

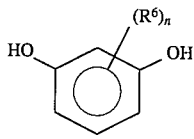

In the above formula, $R^6$ and n are the same as those described above. Specific examples include resorcinol and substituted resorcinols such as 3-methylresorcinol, 3-ethylresorcinol, 3-propylresorcinol, 3-butylresorcinol, 3-t-butyl-resorcinol, 3-phenylresorcinol, 3-cumylresorcinol, 2,3,4,6-tetrafluororesorcinol, 2,3,4,6-tetrabromoresorcinol, etc. The use of resorcinol among them is preferred.

The copolymeric polycarbonate of this invention has the two kinds of structuring units represented by Structure 3 and Structure 4 in the following proportion. Specifically, the amount of the structuring unit represented by Structure 4 is in the range of 2–90 mol %, preferably 2–60 mol % and optimally 2–40 mol % of the total amount of the structuring units represented by Structure 3 and Structure 4. If the amount of the unit represented by Structure 4 is less than 2 mol %, the reduction in glass transition temperature ($T_g$) is insufficient showing no effect improving fluidity. On the other hand, if it is too much, the physical properties such as mechanical strength, heat resistance, etc., are not as excellent as those of the previous polycarbonates.

The weight-average molecular weight of the copolymeric polycarbonate is generally in the range of 10,000–100,000, preferably 18,000–40,000. In this case, the weight-average molecular weight is measured using polystyrene compensated for polycarbonate and GPC (gel permeation chromatography). Furthermore, the specific viscosity measured in methylene chloride at 25° C. is preferably in the range of 0.35–0.65 dL/g.

Such a copolymeric polycarbonate can be prepared by using previously known processess for the production of polycarbonate such as interfacial polymerization using phosgene, melt polymerization, etc. The melt polymerization method is preferable with respect to environmental health since it is not necessary to use toxic substances such as phosgene, methylene chloride, etc.

The conditions of the melt polymerization reaction such as temperature, pressure, etc., are optional, and the reaction may be carried out by using conventional conditions. Specifically, the reaction is carried out at 80°–250° C., preferably 100°–230° C. and optimally 120°–190° C. for 0–5 h, preferably 0–4 h and optimally 0–3 h under atmospheric pressure by reacting diphenol, compound represented by the above Structure 6 and diester of carbonic acid. Subsequently, the reaction temperature is increased while the pressure of the reaction system is reduced to carry out the reaction of diphenol, compound represented by the Structure 6 and diester of carbonic acid, and finally, the reaction of diphenol, compound represented by the above Structure 6 and diester of carbonic acid is carried out at pressure below 5 mm Hg, preferably below 1 mm Hg and temperature in the range of 240°–320° C.

The polycondensation reaction described above may be carried out continuously or batchwise. The reactor to carry out the above reaction is a tank, tube or column reactor.

According to this invention, it is possible to obtain a copolymeric polycarbonate having excellent coloration, water resistance and heat resistance compared with other methods such as interfacial polymerization, etc., even if the amount of the structural unit represented by Structure 4 is over 90 mol % of the total amount of the structural units represented by Structure 3 and Structure 4, that is, the amount of resorcinol and/or substituted resorcinol is over 90 mol per 100 mol of diphenol.

The copolymeric polycarbonate of this invention has sufficient impact resistance even if its terminal is phenol, but if it is a bulkier end group such as p-t-butylphenol, isononylphenol, isooctylphenol, m- or p- cumylphenol (preferably p-cumylphenol) or a chromanyl compound, e.g., chroman, etc., the copolymeric polycarbonate prepared shows excellent low-temperature resistance.

The component (A) may contain optionally a polycarbonate resin in addition to the above copolymeric polycarbonate. Specific examples of such a polycarbonate resin are aromatic polyycarbonate resins prepared by any of the known phosgene and melt methods (e.g., refer to Japanese Kokai Patent Application Nos. Sho 63[1988]-215763 and Hei 2[1990]-124934).

If the component (A) contains both copolymeric polycarbonate and polycarbonate resin, the compounding ratio of the two is optional, for example, 10–90 parts by weight of a polycarbonate resin is used with 10–90 parts by weight of a copolymeric polycarbonate resin.

Furthermore, the specific viscosity of the component (A) measured at 25° C. in methylene chloride is preferably in the range of 0.32–0.65 dL/g.

The component (B) is a copolymer containing (a) aromatic vinyl monomer and (b) vinyl cyanide monomer. As (a) aromatic vinyl monomer usable in this invention, there are, for example, styrene, α-methylstyrene, o-, m-, or p-methylstyrene, vinylxylene, monochlorostyrene, dichlorostyrene, monobromostyrene, dibromostyrene, fluorostyrene, p-tert-butylstyrene, ethylstyrene, vinylnaphthalene, etc., and they may be used alone or as a mixture of two or more kinds. The use of styrene and a-methylstyrene is preferable.

As (b) vinyl cyanide monomer usable in this invention, there are, for example, acrylonitrile, methacrylonitrile, etc., and they are used alone or as a mixture of two or more kinds. The composition ratio is not especially restricted, and it is suitably selected depending on specific applications.

The (a)/(b) composition ratio is not especially restricted, but the component (B) preferably contains 50–95 wt % of (a) and 5–50 wt % of (b), optimally 65–92 wt % of (a) and 8–35 wt % of (b).

As a preferable example of the component (B), there are, for example, SAN resins (styrene/acrylonitrile copolymers).

The process for the production of the copolymer of the component (B) is not especially restricted, and any of the conventionally known methods such as bulk polymerization, solution polymerization, bulk suspension polymerization, suspension polymerization, emulsion polymerization, etc., may be used. Furthermore, it is also possible to blend resins that have been separately copolymerized.

With respect to the compounding ratio of the components (A) and (B), 1–99 parts by weight of (A) and 1–99 parts by weight of (B), preferably 10–99 parts by weight of (A) and 1–90 parts by weight of (B) are used.

The component (C) is discussed as follows. The component (C) is a copolymer containing (a) aromatic vinyl monomer, (b) vinyl cyanide monomer and (c) rubber polymer. Those shown for the component (B) are usable for both (a) aromatic vinyl and (b) vinyl cyanide monomers. As a rubber polymer (c) usable in this invention, there are, for example, diene rubbers such as polybutadiene, polyisoprene, random and block copolymers of styrene/butadiene, hydrogenated derivative of the above block copolymer, acrylonitrile/butadiene copolymer, butadiene/isoprene copolymer, etc., random and block copolymers of ethylene/propylene, ethylene/butene random and block copolymers, ethylene/a-olefin copolymer, ethylenically unsaturated carboxylate copolymers such as ethylene/methacrylate ethylene/butyl acrylate, etc., acrylate/butadiene copolymers, acrylic elastomers such as butyl acrylate/butadiene copolymer, etc., ethylene/vinyl carboxylate copolymers such as ethylene/vinyl acetate, etc., ethylene/propylene/nonconjugated diene terpolymers such as ethylene/propylene/ethylidene norbornene copolymer, ethylene/propylene/hexadiene copolymer, etc., butylene/isoprene copolymer, chlorinated polyethylene, etc., and they are used alone or as a mixture of two or more kinds. The use of ethylene/propylene rubber, ethylene/propylene/nunconjugated diene terpolymer, diene rubbers and acrylic elastomers is preferable, and the use of polybutadiene and styrene/butadiene copolymer is optimal. The styrene content of this styrene/butadiene copolymer is preferably less than 50 wt %.

In addition to the above components (a), (b) and (c), the component (C) of this invention may be compounded with (d) a monomer copolymerizable with these components within a range not damaging the objective of this invention. Specific examples of such a copolymerizable monomer are α,β-unsaturated carboxylic acids such as acrylic acid, methacrylic acid, etc.; esters of α,β-unsaturated carboxylic acid such as methyl (meth)acrylate, ethyl (meth)acrylate, propyl (meth)acrylate, butyl (meth)acrylate, 2-ethyl (meth)acrylate, 2-ethylhexyl methacrylate, etc.; α,β-unsaturated dicarboxylic anhydrides such as maleic anhydride, itaconic anhydride, etc.; imides of α,β-unsaturated dicarboxylic acids such as maleimide, N-methylmaleimide, N-ethylmaleimide, N-phenylmaleimide, N-o-chlorophenylmaleimide, etc., and these monomers may be used alone or as a mixture of two or more kinds.

As a copolymer of the component (C), graft copolymers prepared by carrying out graft copolymerization of those components in the presence of (c) rubber polymer are preferable, and optimally, they are ABS resin (acrylonitrile/butadiene/styrene copolymer), AES resin (acrylonitrile/ethylene/propylene/styrene copolymer), ACS resin (acrylonitrile-chlorinated polyethylene/styrene copolymer) and AAS resin (acrylonnitrile/acrylic elastomer/styrene copolymer).

In the component (C), the composition ratio of the components (a), (b) and (c) is not especially limited, and their suitable amounts are selected depending on specific applications. Furthermore, the copolymers usable for the component (C) can be prepared by the same methods as those usable for the component (B).

The amount of the component (C) to be added is in the range of 0.5–40 parts by weight, preferably 1–30 parts by weight of the total of components (A) and (B) as 100 parts by weight. If the amount of the component (C) is less than the lower limit of the above range, the effects of this invention are not exhibited, on the other hand, if it is over the upper limit of the above range, the rigidity is reduced.

The component (D) of this invention is a rubber complex graft copolymer comprising rubber complex having a complex integrated structure of organopolysiloxane and polyalkyl (meth)acrylate rubber components entangled with each other, and one, two or more kinds of graft-polymerized vinyl monomers.

The production of such a rubber complex graft copolymer may be carried out by the method disclosed, for example, in the specification of Japanese Kokai Patent Application No. Sho 64[1989]-79257.

The rubber complex described above is suitably prepared by emulsion polymerization. First of all, a latex of polyorganosiloxane is prepared, subsequently, the rubber particles of the polysiloxane rubber latex are impregnated with a monomer for synthesizing alkyl (meth)acrylate rubber, and the monomer for synthesizing alkyl (meth)acrylate rubber is polymerized.

The polyorganosiloxane rubber component can be prepared, for example, by carrying out emulsion polymerization of organosiloxane and crosslinking agent (I) as follows, and in this case, a graft crosslinking agent (I) may be used simultaneously.

As an organosiloxane, there are, for example, linear organosiloxanes such as dimethylsiloxane, etc. Furthermore, cyclic organosiloxanes of 3-membered ring or higher, preferably 3–6-membered ring are also usable. For example, there are hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, etc. These organosiloxanes may be used alone or as a mixture of two or more kinds. The amount to be used is 50 wt % or more, preferably 70 wt % or more of the total amount of the polyorganosiloxane component.

As a crosslinking agent (D, there are tri- or tetra-functional silane crosslinking agents such as trimethoxymethylsilane, triethoxyphenylsilane, tetramethoxysilane, tetraethoxysilane, tetra-n-propoxysilane, tetrabutoxysilane, etc. The use of tetra-functional crosslinking agents is preferable, and the use of tetraethoxysilane among them is optimal. These crosslinking agents may be used alone or as a mixture of two or more kinds. The amount to be used is preferably in a range of 0.1–30 wt % of the total amount of the polyorganosiloxane rubber component.

As a graft crosslinking agent (I), there are compounds which can form units represented by the following formulas:

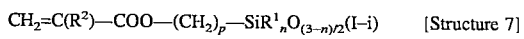  [Structure 7]

  [Structure 8]

or

  [Structure 9]

where $R^1$ is a lower alkyl group such as methyl group, ethyl group, propyl group, etc., or phenyl group, $R^2$ is a methyl group or hydrogen atom, n is 0, 1 or 2, and p is an integer of 1–6. (Meth)acryloyloxysiloxane capable of forming a unit of the above formula (I-1) is advantageous since the graft efficiency is high, forming an effective grafted chain and exhibiting high impact resistance. Incidentally, the use of methacryloyloxysiloxane as a compound forming a unit of the formula (I-1) is optimal. Specific examples of such a methacryloxyloysiloxane are β-methacryloyloxyethyldimethoxysilane, g-methacryloyloxypropylmethoxydimethylsilane, g-methacryloyloxypropyldimetho xymethylsilane, g-methacryloyloxypropyltrimethylsilane, g-methacryloyloxypropylethoxydiethylsilane, g-methacryloyloxypropyldiethoxymethylsilane, d-methacryloyloxybutyldiethoxymethylsilane, etc. They may be used alone or as a mixture of 2 or more kinds. The amount of such a graft crosslinking agent to be used is preferably 0–10 wt % of the total amount of the polyorganosiloxane rubber component.

For the production of this latex of the polyorganosiloxane rubber component, the methods disclosed, for example in the specifications of U.S. Pat. Nos. 2,891,920 and 3,294,725, etc., may be used. For the practical application of this invention, it is preferably produced by, for example, a method carrying out shear mixing of a mixed solution of organopolysiloxane, cross linking agent (I) and if necessary, graft crosslinking agent (I) with water in the presence of a sulfonic acid emulsifier such as alkylbenzenesulfonic acid, alkylsulfonic acid, etc., by using, for example, a homogenizer. The use of alkylbenzenesulfonic acid is suitable since it works not only as an emulsifier of organosiloxane but also as a polymerization initiator. If a metal salt of alkylbenzenesulfonic acid or alkylsulfonic acid is simultaneously used in this case, it is effective to maintain the polymer at the time of graft polymerization stable.

The polyalkyl (meth)acrylate rubber component consisting the above rubber complex can be synthesized by using alkyl (meth)acrylate, crosslinking agent (II) and graft crosslinking agent (II) selected from the following examples.

As an alkyl (meth)acrylate, there are, for example, alkyl acrylates such as methyl acrylate, ethyl acrylate, n-propyl acrylate, n-butyl acrylate, 2-ethylhexyl acrylate, etc., and alkyl methacrylates such as hexyl methacrylate, 2-ethylhexyl methacrylate, n-lauryl methacrylate, etc., and especially the use of n-buff acrylate is preferable.

As crosslinking agent (II), there are, for example, ethylene glycol dimethacrylate, propylene glycol dimethacrylate, 1,3-butylene glycol dimethacrylate, 1,4-butylene glycol dimethacrylate, etc.

As a graft crosslinking agent (II), there are, for example, allyl methacrylate, triallyl cyanurate, triallyl isocyanurate, etc. Allyl methacrylate is also usable as a crosslinking agent. These crosslinking agents and graft crosslinking agents may be used alone or as a mixture of two or more kinds. The total amount of these crosslinking and graft crosslinking agents to be used is preferably in the range of 0.1–20 wt % of the amount of the polyalkyl (meth)acrylate rubber component.

The polymerization of the polyalkyl (meth)acrylate rubber component is carried out by adding the above alkyl (meth)acrylate, crosslinking agent and graft crosslinking agent to polyorganosiloxane rubber component latex neutralized by adding an aqueous solution of a base selected from sodium hydroxide, potassium hydroxide, sodium carbonate, etc., impregnating organosiloxane rubber particles with them, and subsequently allowing a conventional radical polymerization initiator to act. As the polymerization reaction proceeds, polyalkyl (meth)acrylate rubber crosslinked network entangled with the crosslinked network of polyorganosiloxane rubber is formed providing a rubber latex complex comprising practically inseparable polyorganosiloxane and polyalkyl (meth)acrylate rubber components. Incidentally, in the case of practical applications of this invention, this rubber complex used is preferably rubber complex comprising a polyorganosiloxane rubber component, the main skeleton of which has a repeating unit of dimethylsiloxane and polyalkyl (meth)acrylate rubber component, the main skeleton of which has a repeating unit of n-butyl acrylate.

The rubber complex prepared by emulsion polymerization as described above can be graft-copolymerized with a vinyl monomer. The gel content of the rubber complex measured by extracting with toluene at 90° C. for 12 h is preferably 80 wt % or higher.

To obtain satisfactorily balanced flame resistance, impact resistance, appearance, etc., the mixing proportion of the polyorganosiloxane and polyalkyl (meth)acrylate rubber components of the above rubber complex is preferably 3–90 wt % of the former to 10–97 wt % of the latter, furthermore, the average particle size of the rubber complex is in the range of 0.08–0.6 mm.

As a vinyl monomer which can be graft-polymerized with the above rubber complex, there are, for example, aromatic alkenyl compounds such as styrene, a-methylstyrene, vinyltoluene, etc.; methacrylates such as methyl methacrylate, 2-ethylhexyl methacrylate, etc.; acrylates such as methyl acrylate, ethyl acrylate, butyl acrylate, etc.; vinylcyanide compounds such as acrylonitrile, methacrylonitrile, etc.; and they may be used alone or as a mixture of two or more kinds. The optimal vinyl monomer is methyl methacrylate. The amount of such a vinyl monomer to be used is preferably in the range of 5–70 wt % to 30–95 wt % of the above rubber complex.

The rubber complex graft copolymer (D) can be prepared by pouring rubber complex graft copolymer latex prepared by adding the above vinyl monomer to the above latex rubber complex and carrying out single- or multiple-stage radical polymerization into hot water containing dissolved metal salt such as calcium chloride or magnesium sulfate, to carry out salting out and coagulation, isolation and recovering.

The rubber complex graft copolymer (D) such as the one described above is also commercially available, for example, as Metablend S-2001 from Mitsubishi Rayon K. K..

The cornponent (D) is used in the amount in a range of 0.5–40 parts by weight, preferably 1–30 parts by weight per 100 parts by weight of the total amount of the components (A) and (B). If the amount is smaller than the lower limit of the above range, the effects of this invention are not satisfactorily exhibited, and on the other hand, if it is over the upper limit of the above range, the rigidity is reduced.

The resin composition of this invention may contain, in addition to the components described above, additives conventionally used for mixing and molding of resins such as pigments, dyes, reinforcing agents (glass fiber, carbon fiber, etc.), fillers (carbon black, silica, titanium oxide, etc.), thermal resistance agents, oxidation inhibitor, climate resistance agents, smoothing agents, mold-releasing agents, nucleus-forming agents, plasticizers, fluidity improvement agents, antistatic agents, etc., depending on specific applications as long as the physical properties are not damaged.

The method for the production of the resin composition of this invention is not especially restricted, and any of the conventional methods may be used satisfactorily. A small amount of a solvent may be used, but in general, no solvent is required. As a facility, there are, for example, extruder, Banbury mixer, rollers, kneader, etc., and they can be operated continuously or batchwise. The order of mixing of the components is not especially limited.

Application examples

This invention is explained further in detail by using application examples as follows. The following components were used in the application examples.

Component (A)

RS-PC: copolymeric polycarbonate produced as follows.

The first stirring tank (volume of 250 L) was charged with 0.22 kmol of bisphenol A (manufactured by Nippon G. E. Plastics Co., Ltd.), 0.22 kmol of resorcinol, 0.44 kmol of diphenyl carbonate (manufactured by Eny Co.), and the contents were melted at 140° C. While maintaining the same temperature, the mixture prepared was fed to the second stirring tank (volume of 50 L) at a rate of 0.16 kmol per hour as bisphenol A conversion. The temperature of the second stirring tank was maintained at 180° C.

As a catalyst, 0.04 mol per hour of tetramethylammonium hydroxide wand 0.00016 mol (1×10$^{-6}$ mol/mol of bisphenol A) of sodium hydroxide were added, the residence time was adjusted to 30 min, and the reaction mixture was stirred.

Subsequently, the reaction mixture was fed to the third stirring tank (volume of 50 L) at a rate of 0.16 kmol per hour as bisphenol A conversion. The temperature of the third stirring tank was 210° C., the pressure was 200 mm Hg. The residual time was adjusted to 30 min, and the reaction mixture was stirred while the phenol was extracted and removed.

Subsequently, the reaction mixture was fed to the fourth stirring tank (volume of 50 L) at a rate of 0.16 kmol per hour as bisphenol A conversion. The temperature of the fourth stirring tank was 240° C., and the pressure was 15 mm Hg. The residence time was adjusted to 30 min, and the reaction mixture was stirred while the phenol was extracted and removed. The limiting viscosity [h] of the reaction mixture after the reaction entered its steady state was 0.15 dL/g.

Subsequently, the reaction mixture was pressurized by a gear pump and fed to a centrifugation thin-film evaporator at a rate of 0.16 kmol per hour as bisphenol A conversion to continue the reaction. The temperature and pressure of the thin film evaporator were controlled to 270° C. and 2 mm Hg, respectively. The reaction mixture was fed to a biaxial lateral stirring polymerization tank (L/D=3, stirring blade rotational diameter of 220 mm and inside volume of 80 L) controlled at 290° C. and 0.2 mm Hg at a rate of 0.16 kmol per hour (about 40 kg/h) as bisphenol A conversion from the bottom of the evaporator by a gear pump, and the polymerization reaction was carried out with a residence time of 30 min. The limiting viscosity [h] of the product prepared was 0.49 dL/g. The product was a copolymeric polycarbonate having units of the following formulas (Structure 10) and (Structure 11) in a mol ratio of 50:50. It is called RS-PC, below.

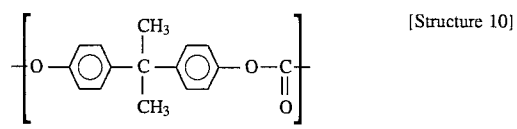

[Structure 10]

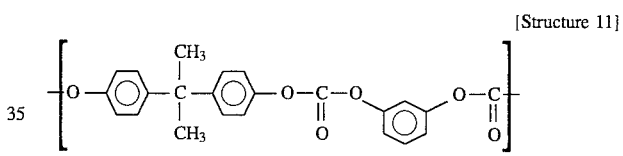

[Structure 11]

Polycarbonate resin: polycarbonate of bisphenol A (trade name: Lexan 121, manufactured by Nippon G. E. Plastics Co., Ltd.). It may be abbreviated as PC, below.

Component (B)

Polycarbonate resin: polycarbonate of bisphenol A (trade name: Lexan 121, manufactured by Nippon G. E. Plastics Co., Ltd.). It may be abbreviated as PC, below.

Component (B)

SAN resin, trade name of SR 30B (manufactured by UbeCycon K. K.)

Component (C)

ABS resin, trade name of UX 050 (manufactured by UbeCycon K. K.)

Component (D)

Metablend S-2001: trade name, methyl methacrylatebutyl acrylatedimethylsiloxane copolymer manufactured by Mitsubishi Rayon Co., Ltd.

Application Example 1 and Comparative Examples 1–4

The components were mixed in the proportions (weight ratio) of Table I, and the mixture was extruded through a biaxial extruder (30 mm) set at 250° C. and 150 rpm to obtain pellets. The pellets prepared were injection-molded at 250° C. with a mold temperature of 60° C. The Izod impact strength was measured for the molding prepared. The results obtained are shown in Table I.

The resin composition evaluation tests were carried out by the following methods.

For the Izod impact strength (kg×cm/cm), the method of ASTM D 256 was used for a sample of ⅛-in thickness with a notch, at 23° C. and −40° C. The ductility destruction rate (%) was determined for measurement (n=5) at each temperature.

TABLE I

| Component (parts by weight) | Comparative example | | | | Application |
| --- | --- | --- | --- | --- | --- |
| | 1 | 2 | 3 | 4 | 1 |
| PC | 80 | 80 | — | — | — |
| RS-PC | — | — | 80 | 80 | 80 |
| SAN resin | 20 | 20 | 20 | 20 | 20 |
| ABS resin | 16 | — | 16 | — | 8 |
| Metablend S-2001 | — | 16 | — | 16 | 8 |
| Izod impact strength Measurement temperature: 23° C. (kḡcm/cm) | 60 | 65 | 63 | 67 | 70 |
| Ductibility destruction rate (%) | 100 | 100 | 100 | 100 | 100 |
| Izod impact strength Measurement temperature: −40° C. (kḡcm/cm) | 19 | 17 | 20 | 21 | 41 |
| Ductibility destruction rate (%) | 0 | 0 | 0 | 0 | 80 |

Effect of the invention

The resin composition of this invention is usable in a wide range of application fields since the impact resistance at low temperature is excellent, and its industrial usefulness is high.

What is claimed is:

1. Impact-resistant resin composition comprising the reaction product of (A) 1–99 parts by weight of a copolymeric polycarbonate, in which there are structural units represented by the following formula (Structure 1):

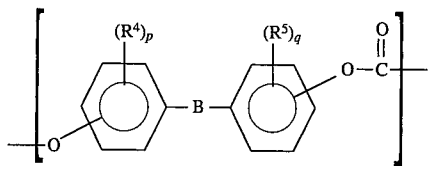

and the following formula (Structure 2):

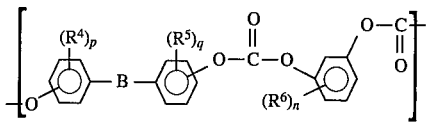

where $R^4$ and $R^5$ are independently halogen atoms or univalent hydrocarbon groups; B is —($R^1$—)C(—$R^2$) where $R^1$ and $R^2$ are independently hydrogen atoms or univalent hydrocarbon groups, —C(=$R^3$)— where $R^3$ is a divalent hydrocarbon group, —O—, —S—, —SO— or —$SO_2$—; $R^6$ is a hydrocarbon group having 1–10 carbon atoms, its halogenated derivative or halogen atom; and p, q and n are independently integers of 0–4; and wherein the amount of the structural unit of Structure 2 is in the range of 2–90 mol % the structural units of Structure 1 and Structure 2 or a mixture thereof based on (A); (B)1–99 parts by weight of a copolymer containing (a) aromatic vinyl monomer and (b) vinyl cyanide monomer as a component; and at the same time, on the total amount of (A) and (B) of 100 parts by weight, (C) 0.5–40 parts by weight of a copolymer containing (a) aromatic vinyl monomer, (b) vinyl cyanide monomer and (c) elastomer as a component; and (D) 0.5–40 parts by weight of a rubber complex graft copolymer comprising rubber complex containing 3–90 wt % polyorganosiloxane and 10–97 wt % polyalkyl (meth)acrylate with a vinyl monomer grafted wherein said rubber complex has an average particle size of 0.08–0.6mm and whereby the low temperature impact resistance of said composition is substantially improved.

2. The resin composition of claim 1, in which (B) in Structure 1 and Structure 2 in component (A) is —($R^1$—)C(—$R^2$)—.

3. The resin composition of claim 2, in which the amount of structural units of Structure 2 in component (A) ranges from 2–60 mol % of the total amount of the structural units of Structure 1 and Structure 2.

4. The resin composition of claim 3, in which component (B) is SAN resin.

5. The resin composition of claim 4, in which component (C) is selected from ABS, AES, ACS or AAS resins.

6. The resin composition of claim 5, in which component (D) is a rubber complex graft copolymer comprising rubber complex having a complex integrated structure of polyorganosiloxane rubber and polyalkyl (meth)acrylate rubber components entangled with each other and one, two or more graft-polymerized vinyl monomers.

7. The resin composition of claim 6, in which the polyorganosiloxane in the component (D) is a linear polyorganosiloxane.

8. The resin composition of claim 7, in which the polyalkyl (meth)acrylate in component (D) is poly(n-butyl acrylate).

* * * * *